(12) United States Patent
Büchler et al.

(10) Patent No.: US 7,151,719 B2
(45) Date of Patent: Dec. 19, 2006

(54) METHOD FOR REDUCING THE NOISE IN A WOBBLE SIGNAL

(75) Inventors: Christian Büchler, Villingen-Schwenningen (DE); Uwe Reschke, Horb am Neckar (DE)

(73) Assignee: Thomson Licensing, Boulogne-Billancourt (FR)

( * ) Notice: Subject to any disclaimer, the term of this patent is extended or adjusted under 35 U.S.C. 154(b) by 335 days.

(21) Appl. No.: 10/486,143

(22) PCT Filed: Aug. 5, 2002

(86) PCT No.: PCT/EP02/08706

§ 371 (c)(1),
(2), (4) Date: Feb. 6, 2004

(87) PCT Pub. No.: WO03/017260

PCT Pub. Date: Feb. 27, 2003

(65) Prior Publication Data

US 2004/0174778 A1 Sep. 9, 2004

(30) Foreign Application Priority Data

Aug. 16, 2001 (DE) ................. 101 40 325

(51) Int. Cl.
*G11B 7/095* (2006.01)

(52) U.S. Cl. ................. 369/44.13; 369/44.14; 369/124.12

(58) Field of Classification Search ............. 369/44.13, 369/124.12

See application file for complete search history.

(56) References Cited

U.S. PATENT DOCUMENTS

| | | | | |
|---|---|---|---|---|
| 5,291,466 | A | * 3/1994 | Kwak | 369/44.35 |
| 5,383,169 | A | * 1/1995 | Shinoda et al. | 369/44.13 |
| 5,398,226 | A | * 3/1995 | Edwards | 369/44.38 |
| 5,434,834 | A | * 7/1995 | Shinoda et al. | 369/44.13 |
| 5,717,679 | A | * 2/1998 | Mashimo et al. | 369/124.04 |

(Continued)

FOREIGN PATENT DOCUMENTS

EP 569082 11/1993

(Continued)

OTHER PUBLICATIONS

D. Abramovitch et al: "High Frequency Wobbles: A Write Clock Generation Method For Rewritable Digital Versatile Disk (DVD) That Enables Near Drop-In Compatibility with DVD-Read Only Memories (DVD-ROMS)", Japanese Journal of Applied Physics, vol. 39, No. 2B, Feb. 2000, pp. 846-854.

*Primary Examiner*—William Korzuch
*Assistant Examiner*—Adam R. Giesy
(74) *Attorney, Agent, or Firm*—Joseph J. Laks; Robert D. Shedd; Reitseng Lin

(57) ABSTRACT

The present invention relates to a method and a circuit for recovering information contained in a wobble track of an optical storage medium. One aim of the invention is to describe a method within an appliance for reading from and/or writing to optical storage media, which can correct disturbing data signal components in the wobble signal even when the swept frequency and the lowest signal frequency are close to one another. According to the invention, this object is achieved in that the signals from two detector halves of a photodetector which is used for reading the data contained in a track on an optical storage medium are provided with weighting factors which are adjusted dynamically during operation of the appliance for reading from and/or writing to optical storage media. In order to adjust the weighting factors, the obtained swept-frequency signal is linked to a data signal.

20 Claims, 5 Drawing Sheets

Figure 1:
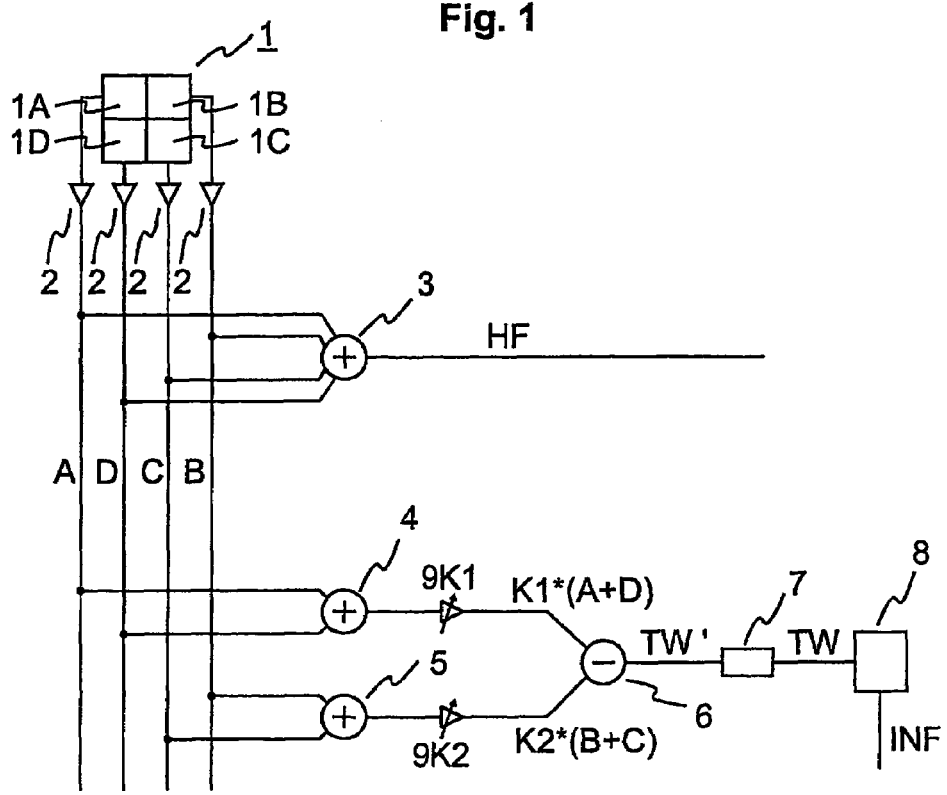

U.S. PATENT DOCUMENTS 5,926,445 A * 7/1999 Sasaki et al. ............ 369/44.25
6,172,952 B1 * 1/2001 Inokuchi et al. ......... 369/47.55
6,181,657 B1 * 1/2001 Kuroda et al. ............. 369/59.1
6,249,499 B1 * 6/2001 Andoh .................... 369/53.22
7,023,779 B1 * 4/2006 Kawashima et al. ..... 369/53.21
7,072,251 B1 * 7/2006 Nakajima et al. ........ 369/44.26

FOREIGN PATENT DOCUMENTS

EP          1098302          5/2001

* cited by examiner

METHOD FOR REDUCING THE NOISE IN A WOBBLE SIGNAL

CROSS REFERENCE TO RELATED APPLICATIONS

This application claims the benefit, under 35 U.S.C. § 365 of International Application PCT/EP02/08706, filed Aug. 5, 2002, which was published in accordance with PCT Article 21(2) on Feb. 27, 2003 in English and which claims the benefit of German patent application No. 10140325.9, filed Aug. 16, 2001.

The present invention relates to a method and a circuit for recovering the information contained in a wobble track of an optical storage medium.

FIELD OF THE INVENTION

Methods such as these are used, for example, in appliances for reading from and/or writing to optical storage media with wobble tracks, in order to obtain address information from the wobble tracks or to use the wobble frequency to produce a write clock.

BACKGROUND OF THE INVENTION

In general, in optical storage media which are in the form of discs and are suitable for reading from and/or writing the embossed tracks are formed such that they represent an interleaved spiral or concentric circles. Especially in the case of optical storage media which are suitable for writing to, the embossed tracks additionally are wobbled in a specific form, in order to find specific positions on the medium. This means that the track is not embossed in an approximately straight line, but in serpentine lines. By way of example, the shape of these serpentine lines can contain address information which is used to identify a specific position on this optical storage medium. Various methods are used for coding, examples of which include frequency modulation or phase modulation. Furthermore, the wobble signal may also be used for rotation speed information or for presetting a write data rate.

Normally, the modulation shift of this track wobble is kept small, so that there is no noticeable effect on the tracking control and the read quality of the data signal. The modulation shift is thus kept in the order of magnitude of a few percent of the track separation. Furthermore, the modulation frequency is designed to be in a frequency band which is typically above the upper cut-off frequency of the tracking regulator, but is below the lowermost signal frequency of the data signal. However, the small modulation shift means that the signal-to-noise ratio of the wobble signal obtained from it is relatively low. Nevertheless, the coded information and the fundamental frequency should be capable of being coded and reconstructed reliably, in order to allow reliable reading and writing. Disturbance noise components must therefore be effectively suppressed.

U.S. Pat. No. 5,717,679 discloses a system which is able to correct the noise components in the wobble signal resulting from any eccentricity of the wobble track. The circuit which is specified for this purpose uses variable-gain amplifiers in order to compensate for different illumination levels of two detector halves. The system is based on the CD-R technique, which uses a wobble frequency of 22.05 kHz. Since the lowest signal frequency of the data signal is 934 kHz, those data signal components which are likewise present in the wobble signal can easily be removed by means of a low-pass filter, as is also disclosed in U.S. Pat. No. 5,717,679. One disadvantage of this known system is that low-pass filtering is impossible when using wobble frequencies which are close to the lowest signal frequency, as is the case, for example, with DVD technology (wobble frequency 825 kHz). Disturbance data signal components therefore cannot be removed with the disclosed system at high wobble frequencies.

One aim of the invention is to describe a method within an appliance for reading from and/or writing to optical storage media, which can remove disturbance data signal components in the wobble signal even when the wobble frequency and the lowest signal frequency are close to one another.

According to the invention, this object is achieved in that the signals from two detector halves of a photodetector from which a wobble signal is obtained and which is used for reading the data contained in a track of an optical storage medium are provided with weighting factors which are adjusted dynamically during operation of the appliance. In order to adjust the weighting factors, the data signal component in the wobble signal that is obtained is linked to the data signal. Dynamic adjustment of the weighting factors has the advantage that the data signal components in the wobble signal are always suppressed optimally, even if any changes occur in the illumination level of the photodetector during operation.

SUMMARY OF THE INVENTION

According to the invention, the signals from the two detector areas of the photodetector are provided with mutually opposing weighting factors. This has the advantage that the amplitude of the wobble signal obtained from the difference between the signals from the two detector areas is not influenced by the weighting factors.

According to the invention, the data signal is digitized before being linked to the data signal component of the wobble signal, so that the linking process is carried out as a synchronous demodulation process. The advantage of using a digitized data signal is that the synchronous demodulation represents multiplication by ±1, and, technically, this can be carried out easily.

The wobble signal is advantageously normalized before determining the data signal component. This may be done, for example, by means of an averaged sum signal or the signal from one detector half. In consequence, the amplitude of the wobble signal is less dependent on the light power of a light source in the optical scanner, or reflection on the optical storage medium. The reaction time of the control loop to dynamic adjustment of the weighting factors is then likewise less dependent on these variables. One advantage of using an averaged sum signal is that such an averaged sum signal is generally already available in appliances for reading from and/or writing to optical storage media.

In a further method according to the invention, the amplitude of the wobble signal is kept constant, by the signals from the two detector halves being normalized separately by means of their respective averaged sum signal.

According to the invention, disturbance data signal components in the wobble signal are removed by means of a circuit which uses one of the methods mentioned above.

A method according to the invention or a circuit according to the invention is advantageously used for recovering the information contained in a wobble track in an optical storage medium in an appliance for reading from and/or writing to optical storage media.

BRIEF DESCRIPTION OF THE FIGS.

Figure 2:
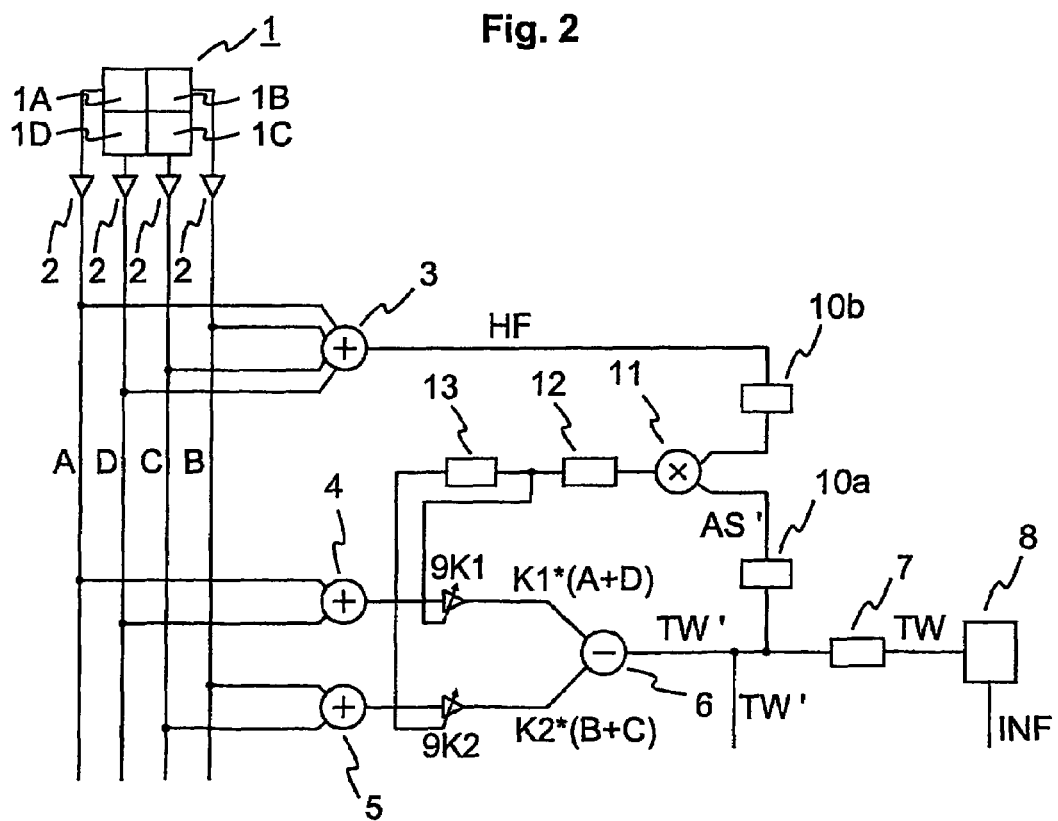
Figure 3:
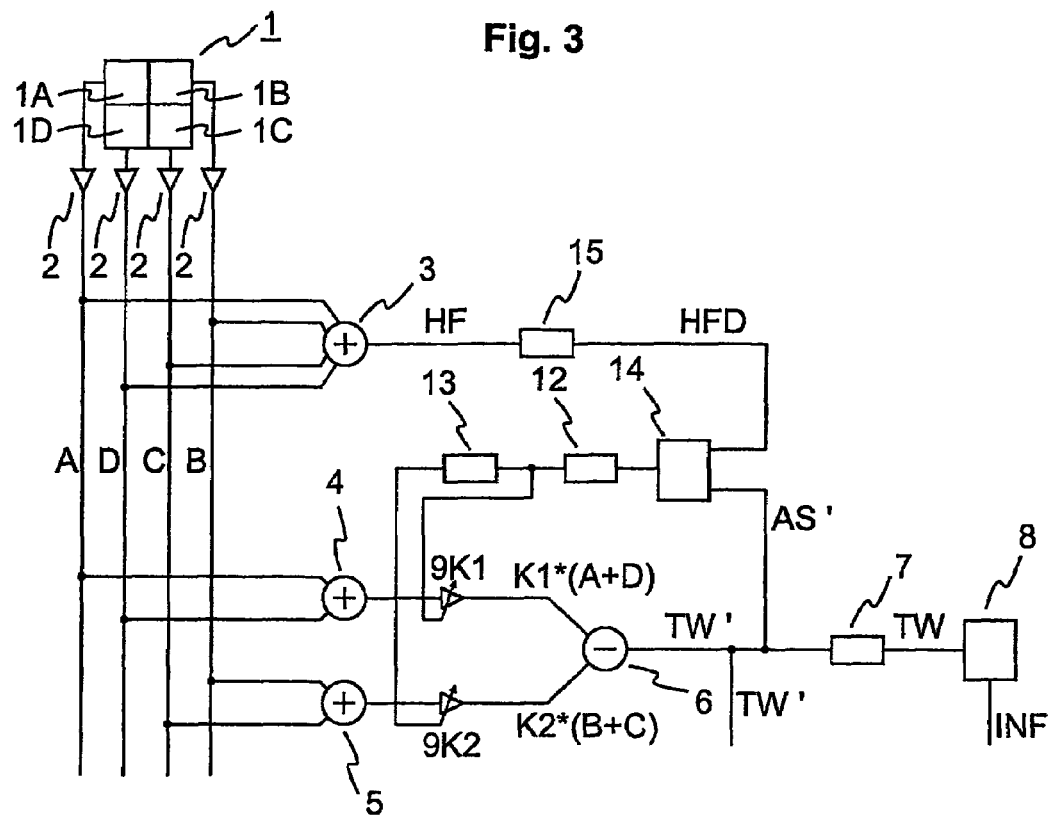
Figure 4:
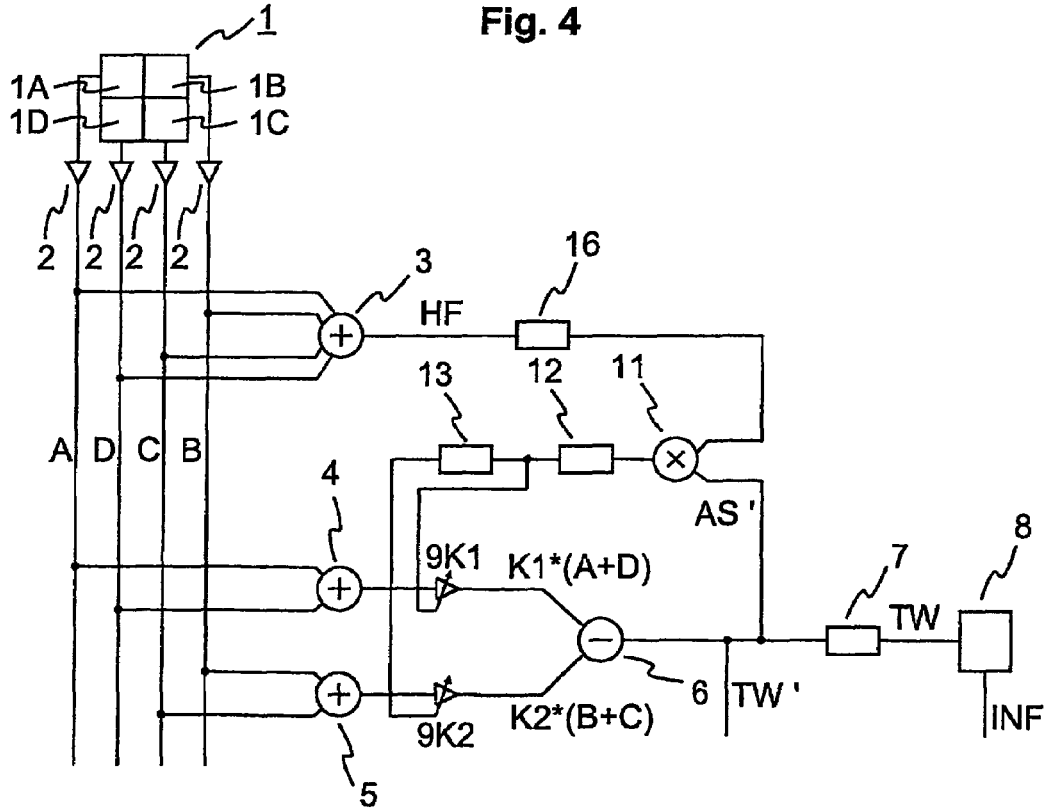
Figure 5:
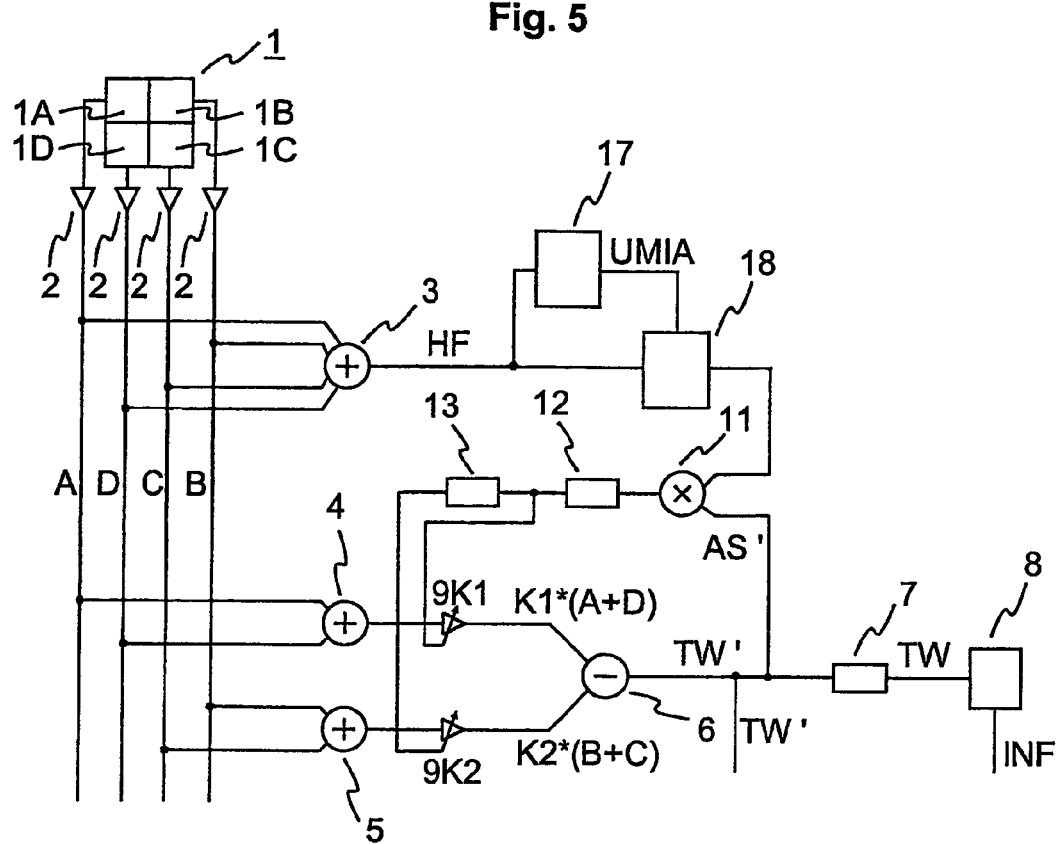
Figure 6:
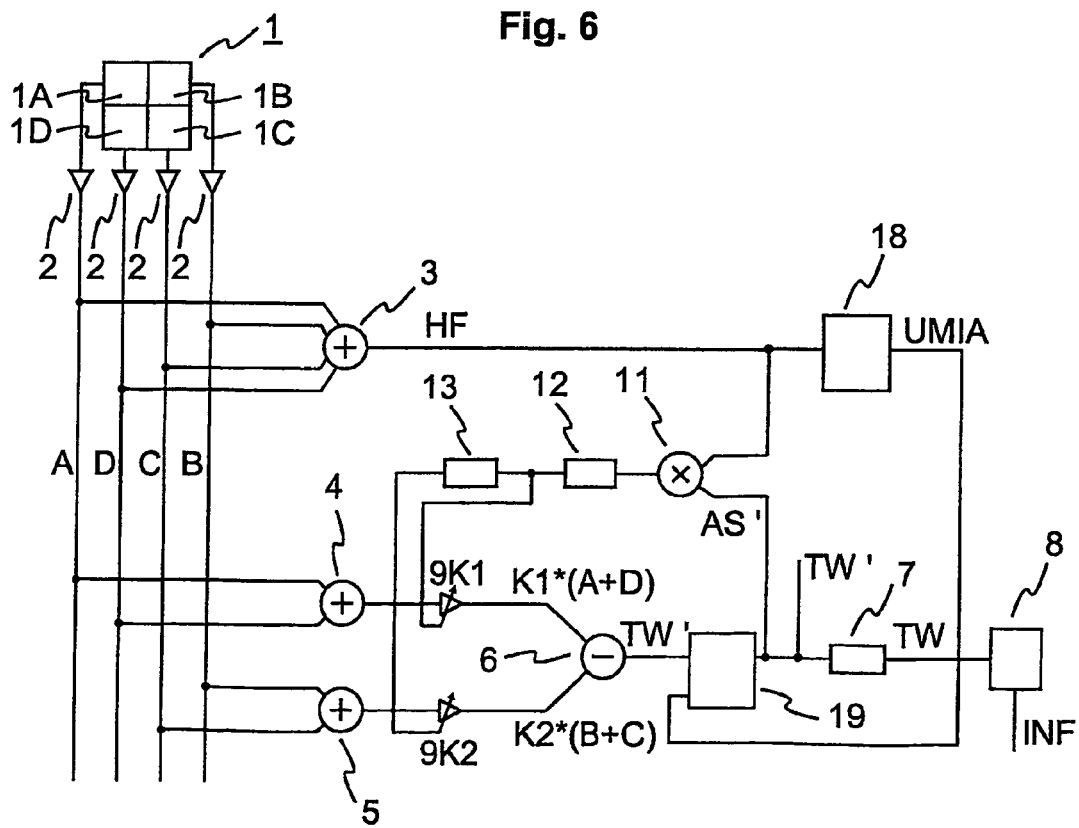
Figure 7:
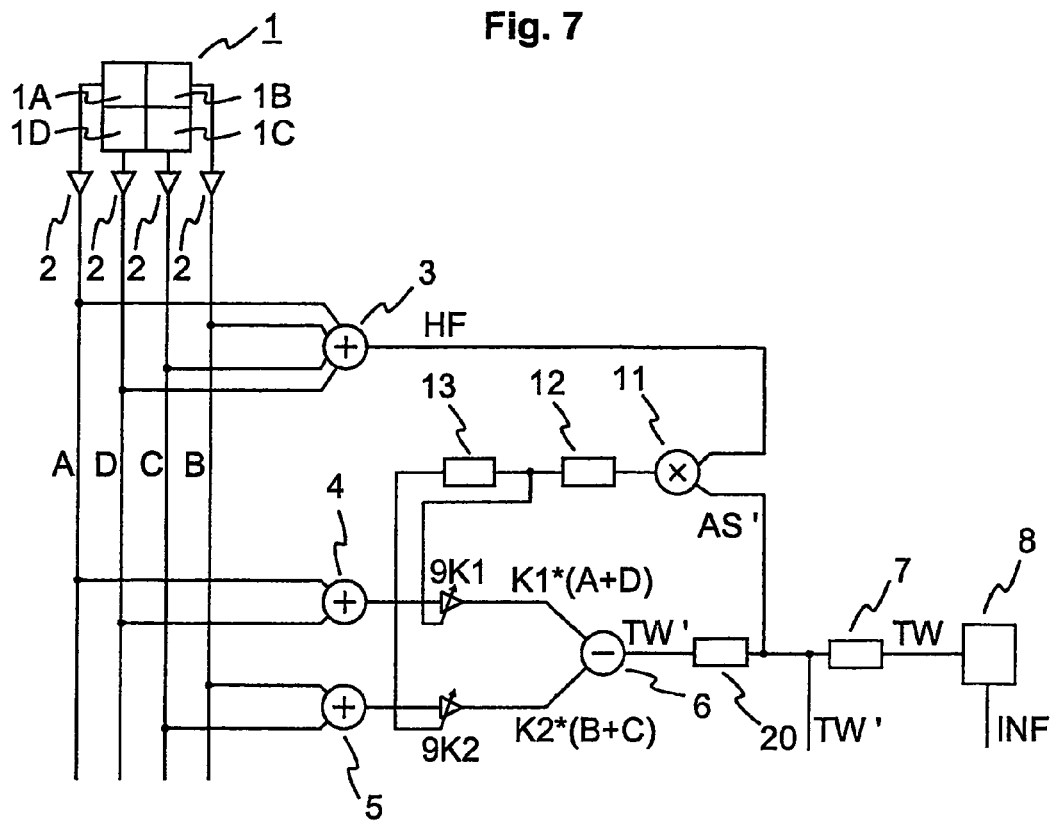
Figure 8:
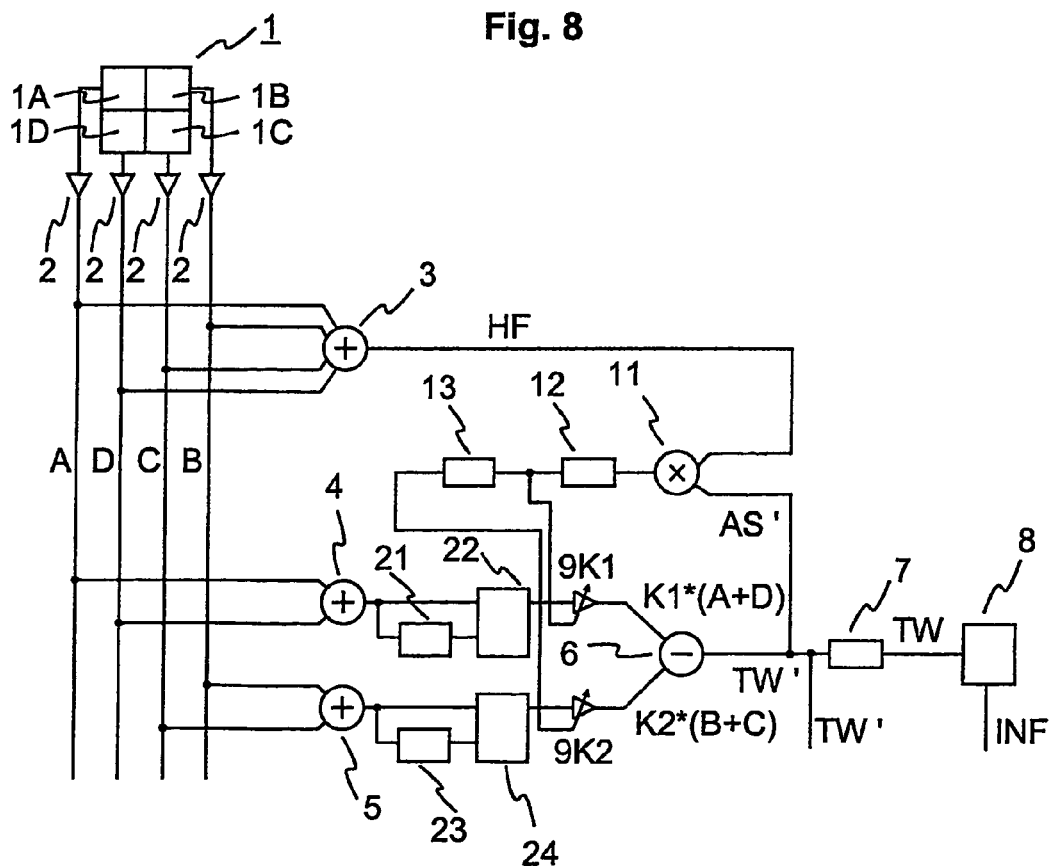
Figure 9:
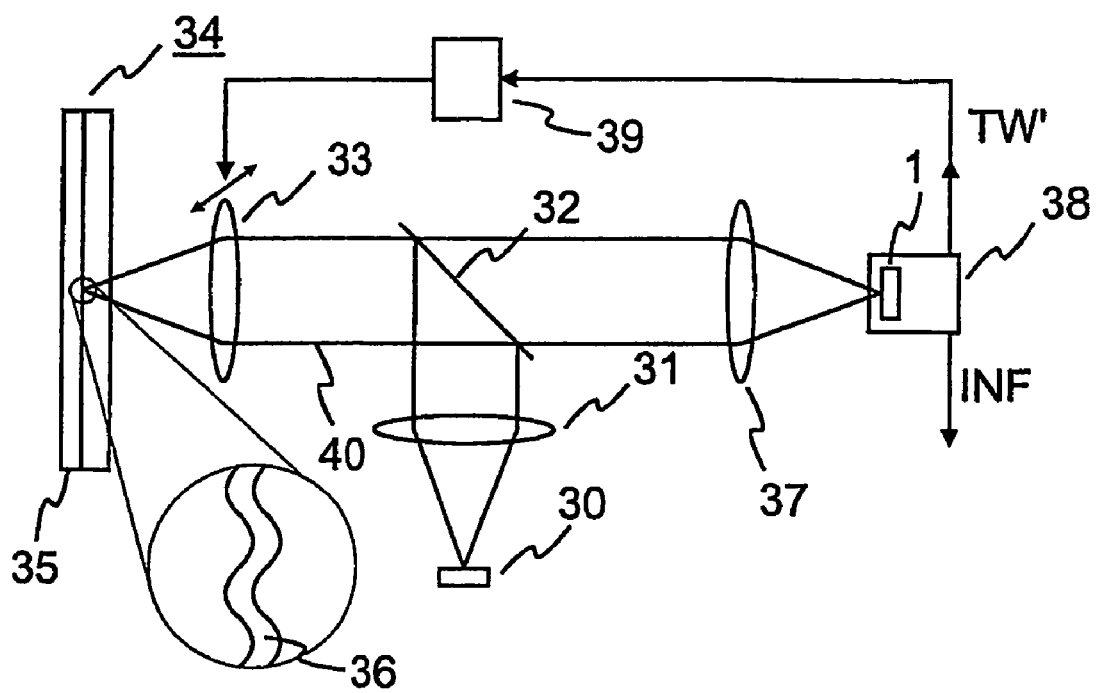

The invention will be explained in the following text with reference to advantageous exemplary embodiments and using FIGS. 1 to 9. Combinations of advantageous exemplary embodiments are, of course, within the applicability area of the invention. In the figures, identical reference symbols denote the same components and signals. In the figures:

FIG. 1: shows an arrangement for obtaining a wobble signal according to the prior art;

FIG. 2: shows an arrangement according to the invention for automatic adjustment of the weighting factors;

FIG. 3: shows a modification of the arrangement corresponding to FIG. 2;

FIG. 4: shows an arrangement corresponding to FIG. 2 with amplitude regulation of the data signal;

FIG. 5 shows an arrangement corresponding to FIG. 2 with the data signal being normalized;

FIG. 6: shows an arrangement corresponding to FIG. 2, with the wobble signal being normalized;

FIG. 7: shows an arrangement corresponding to FIG. 2 with amplitude regulation of the wobble signal;

FIG. 8: shows an arrangement corresponding to FIG. 2, with the signals of the two detector halves being normalized; and FIG. 9: shows an appliance for reading from and/or writing to optical storage media, which has an arrangement according to the invention for automatic adjustment of the weighting factors.

DETAILED DESCRIPTION

FIG. 9 shows an appliance for reading from and/or writing to optical storage media 34, which has an arrangement 38 according to the invention for obtaining information INF contained in a wobble track 36 on the optical storage medium. The scanning beam 40 which is emitted from a light source 30 is collimated by a collimator 31, and is diverted by means of a beam splitter 32. An objective lens 33 focuses the scanning beam 40 onto the wobble track 36 of a layer 35 of an optical storage medium 34 which carries information. The scanning beam 40 reflected from the layer which carries the information is collimated by the objective lens 33 and is imaged on the photodetector 1 by means of an imaging unit 37. A tracking error signal TW' and the information INF are obtained from the signals A, B, C, D from the photodetector 1 by means of an arrangement 38 according to the invention for recovering the information INF contained in a wobble track 36 of an optical storage medium 34. The tracking error signal TW' is supplied to a tracking regulator 39, which itself ensures that the scanning beam 40 moves as close as possible to the track centre of the wobble track 36.

FIG. 1 shows an arrangement for obtaining a wobble signal TW, which is used by a decoding unit 8 to decode the information INF contained in the wobble track 36 of an optical storage medium 34, according to the prior art. The basis for obtaining the signal is the linking of the signals A, B, C, D from a photodetector 1. This makes use of the characteristic that the scanning beam 40 which strikes the optical storage medium 34 as shown in FIG. 9 causes an effect which makes it possible to use the push-pull tracking control method. This effect is based on the principle that a diffraction effect occurs at the edges of the tracks 36, so that not only is a vertical beam (zeroth order) reflected in the direction of the photodetector 1 from the memory layer 35 which carries the information, but also higher-order beams, which are not reflected precisely at right angles to the surface of the memory layer 35. In this case, an objective lens 33 is generally used to collect the reflected zeroth order and $\pm 1^{st}$ order beams and to image them on a photodetector 1, which is subdivided into at least two areas 1A+1D, 1B+1C. In the process, destructive interference of different intensity is formed in the overlapping area between the zeroth order and $\pm 1^{st}$ order as a function of the tracking position, and this is evaluated in the form of a tracking error signal TW'. The resultant tracking error signal TW' is thus referred to as the push-pull tracking error signal.

In order to obtain this tracking error signal TW', the output signals A, B, C, D from the photodetector 1 are first of all amplified by means of amplifiers 2, and are then linked, for example as shown in FIG. 1. The photodetector 1 is typically subdivided into four areas 1A, 1B, 1C, 1D, in order to obtain a focusing error signal (not shown) at the same time, in addition to the tracking error signal TW'. However, in order to obtain the tracking error signal TW' using the push-pull effect, it is sufficient to subdivide the photodetector 1 into a right-hand half 1B+1C and a left-hand half 1A+1D, and to subtract the output signals from these two detector halves from one another. In the case of a four-quadrant detector, this is done by first of all carrying out the logic operations (A+D) and (B+C) using two adders 4, 5. The difference signal (A+D)−(B+C) is then formed by means of a differential amplifier 6. The difference signal (A+D)−(B+C) obtained in this way is then supplied to a tracking regulator 39, as the tracking error signal TW'. The tracking regulator 39 for its part ensures that the scanning beam 40 is moved as close as possible to the track centre of a predetermined track 36.

In order to decode the information INF contained in the wobble tracks 36 of an optical storage medium 34, or in order to form a write clock, the wobble signal TW is supplied to a decoding unit 8 which, by way of example, emits address information and/or a write clock. The wobble signal TW is itself formed by filtering from the push-pull tracking error signal TW', by means of a filter 7.

On the other hand, the data signal HF which represents the information content of the optical storage medium 34 is formed from the output signals A, B, C, D from the photodetector 1 by addition in an adder 3. In order to allow detection by addition of the photodetector signals A, B, C, D, the information is stored by writing light/dark contrasts or by embossing so-called pits on the optical storage medium 34.

If the scanning beam 40 is following the centre of an embossed track 36, the scanning beam 40 is reflected at the layer 35 of the optical storage medium 34 which carries the information, such that, ideally, a round light spot is imaged onto the photodetector 1, at whose sides the already mentioned interference resulting from the push-pull effect is observed. The total intensity of this light spot is modulated by the brightness contrast of the area illuminated by the scanning beam 40.

Since the data is stored by means of structures which cause brightness differences, the intensity of the light spot is thus modulated such that it corresponds to the data on the memory layer 35. Ideally, this is carried out in a synchronized manner on the two detector halves 1A+1D, 1B+1C. Since the tracking error signal TW' and the wobble signal TW derived from it are derived from the difference (A+D)−(B+C) between the signals from the detector halves 1A+1D, 1B+1C the data signal component caused by the brightness contrast is cancelled out during the subtraction process by the differential amplifier 6. However, if the imaging of the scanning beam 40 on the photodetector 1 is not ideally axially symmetrical, then a data signal component AS' is superimposed on the desired signal component which represents the wobble track 36. This results in it not being possible to evaluate those signal components which are caused by the wobble track 36 as well as before, so that errors occur in the address evaluation.

An improvement is achieved if the weighting between the output signals (A+D), (B+C) from the two halves 1A+1D, 1B+1C of the photodetector 1 is changed before the subtraction process by the differential amplifier 6, so that the contrast-dependent components of the alternating light amplitudes are cancelled out on the two halves 1A+1D, 1B+1C of the photodetector 1.

To this end, the four photodetector signals A, B, C, D are first of all amplified by means of amplifiers 2. Two signal elements (A+D), (B+C) are then produced by summation in the adders 4, 5 and these reproduce the modulation on the respective halves 1A+1D, 1B+1C of the photodetector 1. Before the subsequent subtraction process, the signal (A+D) is passed through an amplifier 9K1 with a variably adjustable gain K1, so that the difference signal TW' is formed in accordance with the following relationship:

$$TW'=K1\times(A+D)-(B+C)$$

The weighting process results in the data signal components which are imaged onto the detector halves 1A+1D, 1B+1C as a result of the different modulation being set to the same magnitude before the subtraction process, so that they cancel one another out. This can also be achieved in an equivalent manner by passing the signal (B+C) through an amplifier 9K2 with a variably adjustable gain K2, corresponding to the following signal calculation:

$$TW'=(A+D)-K2\times(B+C)$$

The two solutions have the common feature that the resultant amplitude of the difference signal TW' changes as a function of the weighting factor K1, K2 setting. This can be avoided by the two signals (A+D), (B+C) being weighted, and by the weighting factors K1, K2 being matched to one another such that K2=1−K1. The following signal calculation is thus used:

$$TW'=K1\times(A+D)-(1-K1)\times(B+C)$$

The tracking error signal TW' normally has any further undesirable signal components, such as low-frequency disturbances caused by residual tracking errors and so on, removed from it by means of a filter 7, in order to obtain the wobble signal TW which is supplied to the decoding unit 8.

During operation of the appliance for reading from and/or writing to optical storage media 34, it is possible, however, for a situation to occur caused by heating, ageing or other disturbance variables in which the intensity distribution or position of the image on the photodetector 1 changes. A situation such as this can occur in particular as a result of residual errors in focus control or in tracking control 39. If the weighting factors K1, K2 are set only once during production of the appliance, it is impossible to compensate for such variables, which vary dynamically.

In order to overcome this disadvantage, it is advantageous to adjust the weighting factors K1, K2 automatically during operation such that the disturbance data signal components cancel one another out as well as possible in the subtraction process 6.

An arrangement according to the invention for automatic adjustment of the weighting factors K1, K2, in which the data signal HF obtained by summation of the signals A, B, C, D from the photodetector 1 is multiplied by the data signal component AS' from the difference signal TW' or from the wobble signal TW, the result of the multiplication is integrated, and the result of the integration used to adjust the weighting factors, is shown in FIG. 2.

The difference signal TW' obtained in the manner described in FIG. 1 has low-frequency disturbances removed from it by means of a filter 10 which can pass only the data signal frequency band, and this is supplied to a first input of a multiplier 11. The wobble signal TW can also be used instead of the difference signal TW'. The second input of the multiplier 11 is supplied with the data signal HF which also has low-frequency disturbances removed from it by means of a filter 10b. The output signal from the multiplier 11 is integrated by an integrator 12. The output signal from the integrator 12 controls the first weighting factor K1, while the output signal converted by a converter 13 controls the second weighting factor K2. The converter 13 is, for example, a divider, an inverter or a functional block which calculates the value 1−x to a value x. Other converters may of course also be used.

The invention is based on the alternating light modulations on the two detector halves 1A+1D, 1B+1C being in phase with one another. For this reason, the sum of the output signals A, B, C, D from the photodetector areas 1A, 1B, 1C, 1D is used to obtain the data signal. The voltage produced in the photodetector 1 is in this case proportional to the intensity reflected from the optical storage medium 34.

A corresponding situation applies to the two detector halves 1A+1D, 1B+1C, so that if the weighting K1, K2 is set to be the same in the two branches during the subtraction process by means of the differential amplifier 6, the data signal components cancel one another out, provided the amplitudes are equal. However, if there is an amplitude difference, then an undesirable data signal component AS' remains in the difference signal TW' after the subtraction process, and this is also present in the wobble signal TW after filtering by the filter 7. This data signal component AS' is at a phase angle of 0° or 180° relative to the data signal HF, depending on which half 1A+1D, 1B+1C of the photodetector 1 receives more reflected light. In the example shown in FIG. 2, the phase angle between the data signal HF and the data signal component AS' in the difference signal TW' will be zero when the detector half 1A+1D is illuminated more strongly. When the detector half 1B+1C is illuminated more strongly, then the negative mathematical sign in the subtraction process for the difference signal TW' means that the phase angle between the data signal HF and the data signal component AS' in the difference signal TW' will be 180°. At the limit, when the modulations on the detector halves 1A+1D, 1B+1C are equal or the weighting, K1, K2 is set correctly, the data signal component AS' in the difference signal TW' is zero, and thus in the ideal case, no phase angle can be found.

This behaviour is made use of by multiplying the data signal HF by the data signal component AS' in the difference signal TW'. This multiplication results in an output signal whose mathematical sign is positive or negative depending on the phase angle, and whose magnitude is dependent on the amplitude of the data signal component AS' in the difference signal TW'. The magnitude of the output signal from the multiplier 11 becomes greater the greater the difference between the data signal components in (A+D) with reference to (B+C). The mathematical sign indicates which of the signal components is larger and should be attenuated by appropriate weighting K1, K2.

If the output from the multiplier 11 is connected to an integrator 12, then the integrator 12 changes its output voltage until the data signal component AS' in the difference signal TW' becomes zero. If the output signal from the integrator 12 sets the weighting factor K1, K2 of the one or the two branches to form the difference signal TW', then this results in a control loop with an integrating response. In this case, the integrator 12 varies the weighting K1, K2 until the output signal from the multiplier 11 becomes zero.

The data signal component AS' in the wobble signal TW is thus likewise zero. Since only the data signal components AS' are intended to be multiplied by one another, it is advantageous, as shown in FIG. 2, to remove the low-frequency components from the input signals to the multiplier 11. This can be done, for example, by means of high-pass or bandpass filters 10a, 10b, which allow only the data signal frequency band to pass. For reasons of clarity, these filters 10a, 10b are not shown in the other figures.

The advantage of an integrating control loop response is that, after a time which is dependent on the integration time constant, the weighting K1, K2 is always set such that the data signal component AS' in the wobble signal TW becomes zero. The remaining residual error, that is to say in this case the data signal component AS' in the wobble signal TW, will always become zero when the control loop has an integrating response. However, the integration time is dependent on the magnitude of the signal at the input of the integrator 12, that is to say in the case of the weighting factor control loop, from the amplitude of the output of the multiplier 11. This amplitude is in turn dependent on the amplitude of the input signals to the multiplier 11, that is to say from the data signal HF and the data signal component AS' in the wobble signal TW. If, for example, the light power from the light source 30 in the optical scanner or the reflection of the optical storage medium 34 is halved, then the output amplitude of the multiplier 11 is divided by four, which means that the integration time is increased by a factor of 4.

FIG. 3 shows an arrangement corresponding to that in FIG. 2, in which a synchronous demodulator 14, which has a digital input and an analogue input, is used instead of the multiplier 11. The data signal component AS' of the difference signal TW' is supplied to the analogue input of the synchronous demodulator 14. The data signal HF is digitized by means of a comparator 15, and the digitized data signal HFD is then supplied to the digital input of the synchronous demodulator 14. The weighting factors K1, K2 are set as already described with reference to FIG. 2. Firstly, this arrangement has the advantage that the amplitude of the digitized data signal HFD can assume only two fixed values, as a result of which the integration time is less dependent on the light power from the light source 30 in the optical scanner or the reflection of the optical storage medium 34. On the other hand, the multiplication by the digitized data signal HFD represents a multiplication by ±1, which is technically simple to implement.

FIG. 4 shows a further exemplary embodiment according to the invention, corresponding to that shown in FIG. 2, in which the amplitude of the data signal HF is kept constant by an amplitude regulator 16. An analogue multiplier 11 is used in this case.

FIG. 5 shows an arrangement corresponding to that in FIG. 2, in which the amplitude of the data signal HF is normalized with the aid of the averaged sum signal UMIA. For this purpose, the data signal HF is supplied to an averager 18, whose output signal UMIA is applied to a normalizer 17, and is used to normalize the data signal HF. An analogue multiplier 11 is used in this case as well.

Both exemplary embodiments have the advantage that the amplitude of the data signal HF is kept constant, so that the integration time is less dependent on the light power from the light source 30 in the optical scanner or the reflection of the optical storage medium 34. Furthermore, a normalized data signal is generally available in appliances for reading from and/or writing to optical storage media, so that the available signal can advantageously be used.

The arrangement shown in FIG. 6 differs from the arrangement shown in FIG. 5 in that the difference signal TW' is normalized, instead of the data signal HF, by the averaged sum signal UMIA. The output signal UMIA from the averager 18 is supplied to a normalizer 19, which normalizes the difference signal TW' on the basis of the signal UMIA.

The arrangement shown in FIG. 7 corresponds to the arrangement in FIG. 4 with the difference that the amplitude of the difference signal TW', rather than the amplitude of the data signal HF, is kept constant by an amplitude regulator 20.

The advantage of the two arrangements mentioned above is that the integration time is less dependant on the light power from the light source 30 in the optical scanner, or the reflection of the optical storage medium 34.

The signals (A+D), (B+C) from the two detector halves 1A+1D, 1B+1C are advantageously normalized separately, by means of their respective averaged sum signal, before amplification by the variable amplifiers 9K1, 9K2 and before subtraction by the differential amplifier 6, as is illustrated in FIG. 8. The sum signal (A+D) from the first detector half 1A+1D is for this purpose supplied to the averager 21, whose output signal is supplied to the normalizer 22 and is used to normalize the sum signal (A+D). In a corresponding way, the sum signal (B+C) from the second detector half 1B+1C is normalized by means of the averager 23 and the normalizer 24.

The advantage of this arrangement is that the amplitudes of the signals (A+D), (B+C) from the two detector halves 1A+1D, 1B+1C are completely independent of the reflection and of the light power.

One of the arrangements shown in FIG. 2 to FIG. 8 is advantageously used in an appliance for reading from and/or writing to optical storage media with wobble tracks as is shown in FIG. 9.

The invention claimed is:

1. A method for obtaining information from a wobble track of an optical storage medium by producing a wobble signal from the difference between the signals from two photodetector areas of a photodetector, with the signal from one detector area being provided with a weighting factor, wherein a data signal, which is obtained by summing the signals from the photodetector, is linked to a data signal component which is contained in the wobble signal and is used for automatic adjustment of the weighting factor.

2. A method according to claim 1, wherein the signal from the other detector area is provided with a weighting factor.

3. A method according to claim 2, wherein the weighting factors are mutually opposing.

4. A method according to claim 3, wherein the weighting factors are dependant on one another in accordance with the relationship K2=1−K1.

5. A method according to claim 1, wherein the data signal is digitized, the digitized data signal and the data signal component contained in the wobble signal are demodulated in synchronism with one another, and the resultant signal is integrated.

6. A method according to claim 1, wherein the data signal and the data signal component contained in the wobble signal are multiplied by one another, and the resultant signal is integrated.

7. A method according to claim 6, wherein the data signal and/or the wobble signal is normalized.

8. A method according to claim 6, wherein the signals from the two detector halves are normalized.

9. A method according to claim 6, wherein the amplitude of the data signal and/or of the wobble signal is kept constant by an amplitude regulator.

10. A method according to claim 1, wherein the data signal and/or the wobble signal is high-pass filtered before the linking data signal to the data signal component which is contained in the wobble signal.

11. A circuit for obtaining information from a wobble track of an optical storage medium by producing a wobble signal from the difference between the signals from two photodetector areas of a photodetector, with the signal from one detector area being provided with a weighting factor, wherein the said circuit has an adder for obtaining a data signal, and a logic unit for linking the data signal and a data signal component in the wobble signal, the output signal from which logic unit is supplied to a unit for determining a weighting signal, which adjusts the weighting factor.

12. A circuit according to claim 11, wherein the signal from the second detector area is provided with a weighting factor, which is set by a weighting signal produced by a converter.

13. A circuit according to claim 12, wherein the weighting factors are mutually opposed.

14. A circuit according to claim 13, wherein the weighting factors are dependent on one another in accordance with the relationship $K2=1-K1$.

15. A circuit according to claim 11, wherein the said circuit has a comparator for digitizing the data signal, a synchronous demodulator for multiplication of the digitized data signal and the data signal component in the wobble signal, and an integrator for integration of the output signal from the synchronous demodulator.

16. A circuit according to claim 11, wherein the said circuit has a multiplier which multiplies the data signal and the data signal component in the wobble signal by one another, and has an integrator which integrates the output signal from the multiplier.

17. A circuit according to claim 16, wherein the said circuit has an averager and a normalizer for normalizing the data signal and/or the wobble signal.

18. A circuit according to claim 16, wherein the said circuit has an amplitude regulator for keeping the amplitude of the data signal and/or of the wobble signal constant.

19. A circuit according to claim 11, wherein the said circuit has a filter for high-pass filtering the data signal and/or the wobble signal before linking the data signal to the data signal component which is contained in the wobble signal.

20. Appliance for reading from and/or writing to optical storage media, wherein said appliance has a circuit according to claim 11.

* * * * *